US006562413B1

(12) United States Patent
Morgavi

(10) Patent No.: US 6,562,413 B1
(45) Date of Patent: May 13, 2003

(54) INK CROSS-LINKING BY UV RADIATION

(75) Inventor: Paul Morgavi, La Ciotat (FR)

(73) Assignee: Gemplus, Gemenos (FR)

( * ) Notice: Subject to any disclaimer, the term of this patent is extended or adjusted under 35 U.S.C. 154(b) by 0 days.

(21) Appl. No.: 09/446,802

(22) PCT Filed: Jun. 18, 1998

(86) PCT No.: PCT/FR98/01281

§ 371 (c)(1), (2), (4) Date: May 24, 2000

(87) PCT Pub. No.: WO98/58806

PCT Pub. Date: Dec. 30, 1998

(30) Foreign Application Priority Data

Jun. 23, 1997 (FR) .......................................... 97 08176

(51) Int. Cl.$^7$ ............................ C08F 2/48; B41M 7/00

(52) U.S. Cl. ....................... 427/466; 427/491; 427/487; 427/508; 427/510; 427/511; 523/300; 522/1; 522/2; 204/157.44; 264/494

(58) Field of Search ................................ 347/102, 103, 347/104, 105, 101, 96; 427/466, 491, 508, 510, 511, 487; 522/2, 1; 101/3.1; 523/300; 204/157.44; 264/494

(56) References Cited

U.S. PATENT DOCUMENTS 4,813,351 A 3/1989 Pierson, Jr. ................. 101/115
5,312,654 A * 5/1994 Arimatsu et al. ........... 101/466
5,502,310 A 3/1996 Niestrath et al. ........ 250/492.1
5,777,639 A * 7/1998 Kageyama et al. ........... 347/15
5,985,376 A * 11/1999 Kamen ........................ 118/58
6,092,890 A * 7/2000 Wen et al. .................. 235/375
6,107,010 A 8/2000 Corniglion et al.
6,135,654 A * 10/2000 Jennel ......................... 101/35
6,145,979 A * 11/2000 Caiger et al. ............... 347/102
6,164,757 A * 12/2000 Wen et al. .................. 347/103
6,309,060 B1 * 10/2001 Timmermans-Wang et al. . 347/102
6,312,123 B1 * 11/2001 Codos et al. ............... 347/101
6,322,208 B1 * 11/2001 Bugner et al. .............. 347/104
6,350,496 B1 * 2/2002 Haftvani et al. .............. 156/63

FOREIGN PATENT DOCUMENTS

EP 0641648 3/1995
GB 2031298 4/1980
WO WO-97/04964 A1 * 2/1997

* cited by examiner

*Primary Examiner*—James J. Seidleck
*Assistant Examiner*—Sanza L. McClendon
(74) *Attorney, Agent, or Firm*—Burns, Doane, Swecker & Mathis, L.L.P.

(57) ABSTRACT

The invention concerns a method for cross-linking photosensitive inks in particular polymersible inks (36) by ultraviolet radiation consisting in a step (35) inking dots (31) on a base (38) and a subsequent step consisting in applying a concentrated ultraviolet beam (32) on the inked dots (31), except for the base non-inked surfaces (30). The beam is in particular an ultraviolet laser beam. The invention is applicable to jet dot-matrix printing and polychromy.

39 Claims, 3 Drawing Sheets

INK CROSS-LINKING BY UV RADIATION

This application is based on French Patent Application No. 97/08176, filed on Jun. 23, 1997, which is incorporated by reference herein.

BACKGROUND

1. Field of the Invention

The present invention relates to the field of printing using photosensitive inks, i.e. inks which can be dried or polymerised by light radiation, notably ultraviolet radiation.

2. Related Background

Printing on supports such as plastics materials which do not absorb traditional inks based on water, alcohol or oil has been made possible by developing solvent-based inks adapted to these materials and concurrently polymeric inks capable of solidifying and adhering to the material.

A prohibitive drawback of solvent-based inks is the harmfulness of the solvents used, of the acetone type. Printing with such inks requires complex devices collecting the solvents given off and major precautions in use.

Polymeric inks do not have these drawbacks in use and lend themselves particularly well to printing dot by dot, notably by inkjet.

In the liquid phase, these inks have a fluidity which makes it possible to mechanically deposit, notably in an offset process, ink drops of very fine size, or to spray drops dot by dot onto a support.

The definitive fixing of polymeric inks is effected during a so-called ink cross-linking step which follows the deposition of the ink drops.

Cross-linking consists in polymerising or crystallising the ink, the polymers making up the ink being bonded together in order to form longer polymer chains and to be fixed to the support. A cross-linking step therefore enables the ink to be solidified and fixed to the support.

The supports consisting of plastics material, such as polyvinyl chloride (PVC), polyethylene (PE), polyethyltetraethylene (PET), polycarbonates (PCs), acrylonitrile-butadiene-styrene (ABS) and other organic polymers are quite naturally suited to printing by polymer ink, the polymers in the ink and the polymers in the support being firmly fixed together during the cross-linking.

Cross-linking is obtained by exposure of the ink support to ultraviolet radiation. Ink which can be cross-linked to ultraviolet radiation, abbreviated to UV ink, will therefore be spoken of hereinafter. The energy of the ultraviolet photons allows polymerisation of the polymer chains with each other. However, the support must be exposed to a sufficient ultraviolet radiation power and for a sufficient length of time for the ink to be well fixed to the support and to harden completely.

FIGS. 1 and 2 diagrammatically show known techniques of printing using cross-linkable UV ink. FIG. 1 shows diagrammatically a multicolour offset printing of a support. The support 10 advances between a drive cylinder 15 and contact printing rollers 11, 12, 13 and 14. Each roller 11 or 12 or 13 or 14 contains a screen of the image to be printed. The hollows in the screens on each roller are inked with a black ink or coloured ink, notably cyan, magenta or yellow. Several screens of colour are thus deposited on the support in order to constitute a final multicolour image. The inking step is followed by a step of cross-linking by continuous exposure 19 of the support 10 under an ultraviolet lamp 18. Naturally the offset printing can be monochrome by providing a single black or colour inking roller.

FIG. 2 shows diagrammatically a method of multicolour printing by inkjet. Several reservoirs 21, 22, 23 and 24 containing the black polymer ink and those of different colours feed at least one nozzle ejecting drops of ink, each reservoir preferably having its own line of ejection nozzles, the printing line being transverse to the direction of movement of the support. The ink drops are deposited dot by dot on the support, a device for moving the support and for the computer programming of the image to be printed controlling the ejection of the drops through each nozzle in the line with if necessary control of the drop volume ejected. The computer system defines the spatial rotation of the points to be inked and controls the ejection or non-ejection of the drops according to this location. The inking of the support 20 is followed by a cross-linking step, still with continuous exposure, the support moving forward under an ultraviolet lamp. FIG. 2 illustrates an alternative printing in which each inking step is followed by a cross-linking step in order to dry each ink before a subsequent inking of a different colour. The printing device of FIG. 2 therefore has in this example four ultraviolet lamps 25, 26, 27 and 28 for drying each ink individually.

In order to increase the printing rates, it has been proposed to increase the power of the ultraviolet lamps, thus reducing the support exposure time, the support still receiving sufficient energy to dry and fix the ink.

However, ultraviolet lamps release a great deal of heat. Printing devices with polymerisable ink must therefore include an expensive and bulky cooling system. The adoption of so-called cold UV lamps, designed to emit less infrared radiation and therefore less heat, do not dispense with the need to have cooling when high printing rates are required.

A drawback of the known printing devices with ink which can be cross-linked by ultraviolet radiation is therefore the high release of heat during the cross-linking steps.

Another drawback is the premature aging of the supports and their yellowing under the effect of the cross-linking ultraviolet radiation.

One aim of the invention is to provide an ink cross-linking method allowing printing at high rate, without the aforementioned drawbacks.

A particular aim of the invention is to prevent the yellowing of the support in order to afford durable printing of high quality.

SUMMARY

Succinctly, these aims are achieved, according to the invention, by providing for the cross-linking to be carried out by an ultraviolet laser beam concentrated on the ink drops deposited on the surface of the support, the white surfaces of the support not being swept by the laser beam.

The invention is implemented by providing a method for the cross-linking of photosensitive ink including a step of inking points on a support and a particular step consisting in applying an ultraviolet beam concentrated on the ink dots, to the exclusion of the non-inked surfaces of the support.

The inking step preferably consists in depositing, dot by dot on a printing support, drops of polymerisable ink, the ink being polymerisable by ultraviolet radiation.

The invention is preferably implemented by the application of an ultraviolet laser beam.

A first embodiment of the invention provides for the application of the laser beam to be effected by dot-by-dot sweeping of the support.

A second embodiment of the invention provides for the application of the ultraviolet beam to be effected by means of an optical fibre or an array of optical fibres.

According to a preferred characteristic of the invention, provision is made for interrupting the ultraviolet beam when it is directed towards the non-inked surfaces of the support, one embodiment of the invention being able to include continuous sweeping of the support.

According to an alternative characteristic, provision is made for modulating with respect to power the ultraviolet beam concentrated on the inked dots.

The invention applies particularly to printing and cross-linking of ink on a support made of plastics material.

Advantageously, the method of cross-linking ink according to the invention applies particularly to a method of printing dot by dot by inkjet and/or a multicolour printing process.

BRIEF DESCRIPTION OF THE FIGURES

Other characteristics, aims and advantages of the invention will emerge from a reading of the description which follows, with regard to the accompanying drawings, given by way of non-limitative examples and in which.

DETAILED DESCRIPTION

The invention is advantageously intended to be implemented following conventional printing steps.

Figure 1:
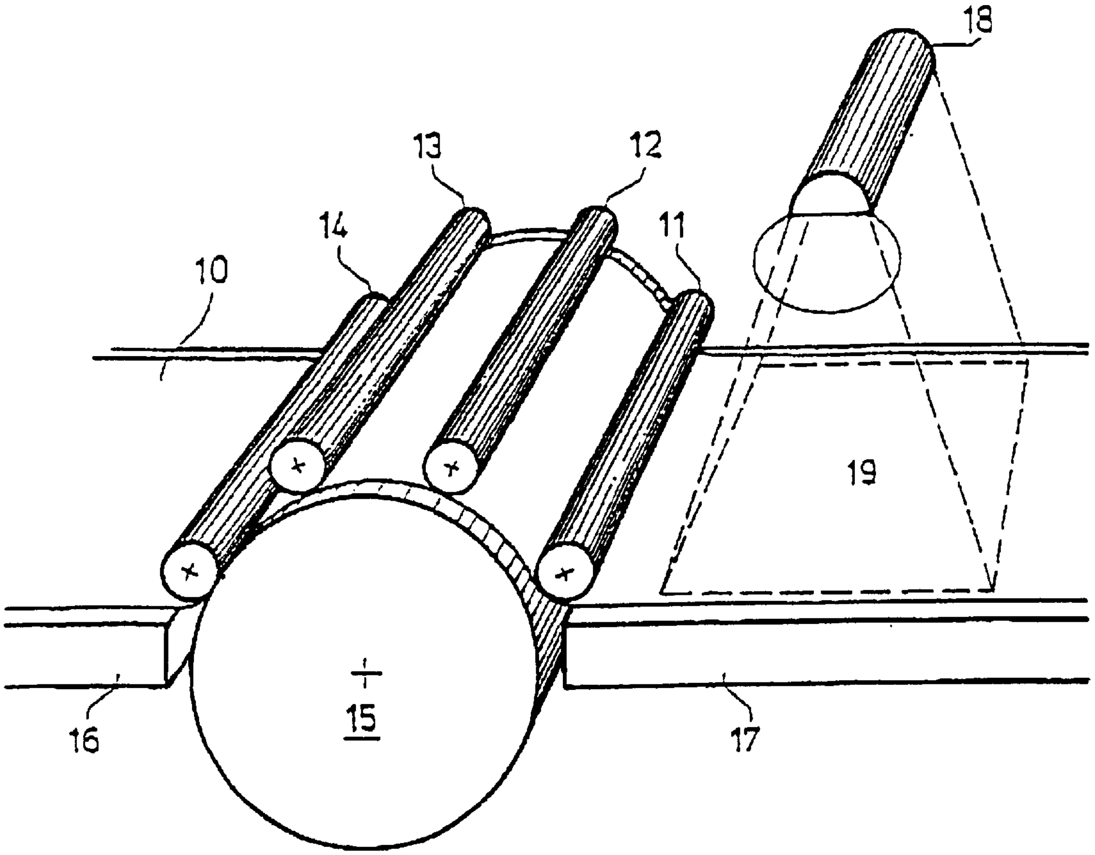
FIG. 1, described previously, depicts printing and cross-linking of UV ink according to a known method, FIG. 2, previously described, depicts printing and cross-linking of UV ink according to another known method.
Figure 2:
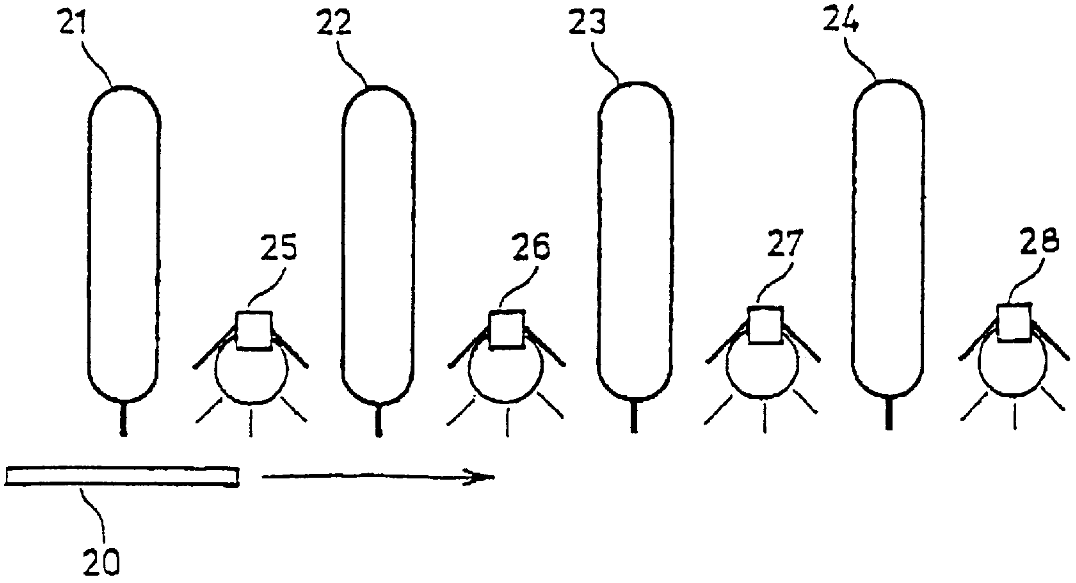
Figure 3:
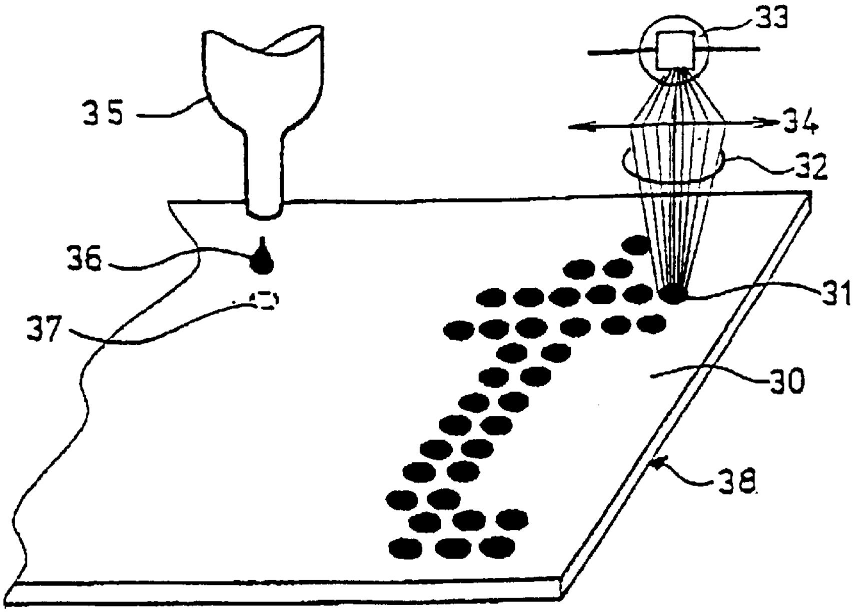
FIG. 3 depicts a method of cross-linking photosensitive ink according to the invention.

Various known printing methods provide, as illustrated in FIG. 3, an inking of the surface of a support 38, the inking notably being able to be effected by mechanical contact under a press or by spraying 37 drops 36 of ink, notably during dot-by-dot inkjet printing.

The method according to the invention thus includes a preliminary step of inking the support, the inking being effected with a photosensitive ink of the type consisting of ink which can be cross-linked by ultraviolet radiation. Preferably, the inking is effected according to the invention by depositing drops of ink which can be polymerised by point-by-point ultraviolet radiation on a printing support.

Upon completion of the printing or more precisely upon completion of this inking step, the support 38 has inked surfaces and non-inked surfaces 30, the inked surfaces consisting of inked points 31 disposed contiguously, or in isolation.

Whatever the relatedness of the inked surfaces, the method according to the invention makes provision for applying an ultraviolet beam concentrated on the ink points, to the exclusion of the non-inked surfaces of the support.

FIG. 3 thus shows an optical device 33, 34 provided schematically with a source of ultraviolet rays 33 and a beam concentrator 34 for concentrating the ultraviolet rays on an inked dot 31.

One advantage of the method according to the invention is that the light power of the source 3 of ultraviolet rays is concentrated on the single dot 31, whose cross-linking is then very rapid. Consequently, a very rapid sweeping of the inked dots can be provided, applying the concentrated beam to each dot for a period of time corresponding to the energy which the ink drop must receive in order to be completely cross-linked.

The method makes provision, according to the invention, for not applying the ultraviolet beam to the non-inked surfaces.

One advantage of such an arrangement is that aging and yellowing of the support are prevented, notably on the non-inked surfaces.

Another advantage is that the light energy applied is lesser compared with the methods of exposure to ultraviolet lamps, no radiation power being dispensed unnecessarily on the non-inked surfaces.

Such an arrangement is implemented easily by providing for the beam 32 to be concentrated on a surface area substantially equal to the surface area of an ink drop. Means of sweeping the support and of distributing the beam will be detailed below in two preferred embodiments of the device implementing the method according to the invention.

The invention is implemented using an ultraviolet laser, although an intense source of ultraviolet of the arc lamp or rotating cathode lamp type can be envisaged.

Figure 4:
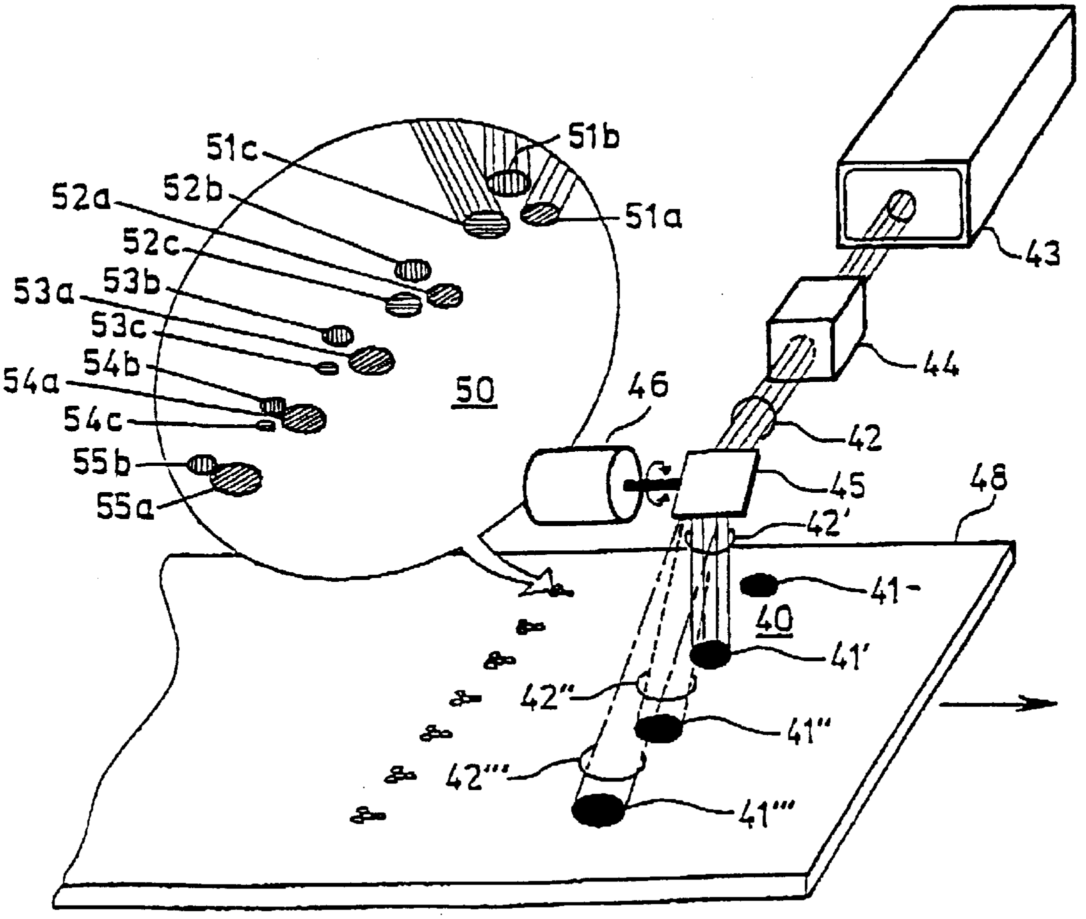
FIG. 4 depicts a first embodiment of the method of cross-linking photosensitive ink according to the invention.

FIG. 4 thus illustrates a laser 43 emitting a coherent ultraviolet radiation beam 42. The beam 42' is diverted in order to concentrate it on an inked dot 41' to be cross-linked.

One advantage of the laser is that the beam 42' of rays emitted can easily have a very much reduced size whilst remaining substantially parallel. The beam 42 can thus be concentrated on a surface as microscopic as the surface of muticolour offset printing dots such as the dots 51*a*, 51*b*, 51*c* and 52*a* to 55*c* depicted in an enlarged view in FIG. 4.

In addition an ultraviolet laser can have a very intense light power, which allows very rapid exposure of each dot to be cross-linked.

The cross-linking time for a support having few inked dots is thus advantageously reduced compared with the known methods. It is possible to choose a laser emission device 43 emitting a beam continuously or in pulses. The time of exposure of a drop under the continuous beam or the number of laser pulses applied to the drop is determined so that the drop receives the cross-linking light energy.

According to a first embodiment of the method according to the invention, application of the ultraviolet beam is effected by dot-by-dot sweeping of the support.

FIG. 4 thus illustrates a sweeping device 46 having a motor orienting a mirror 46 in order to deflect the laser beam 43 to each point on the support.

According to the device illustrated in FIG. 4 the device 45, 46 for deflecting the beam 42 provides a transverse sweeping of the support 48 by the beam 42', 42", 42'" so as to cross-link all the dots 41', 41", 41'" on a transverse line of the support 48. The support is then moved in a longitudinal direction in order to cross-link a following line of dots.

Preferably, the sweeping device 45, 46 is coupled to a dot-by-dot printing computer system, indicating to the sweeping device the exact location of each inked dot of the text or image being printed. The sweeping device can notably receive a command similar to the positioning command for a dot-by-dot print head.

The sweeping provided for by the first embodiment can be effected continuously or discretely, according to two variants.

In the first variant, the angle of deflection of the ultraviolet beam 42 varies continuously, the beam 42' being deflected progressively all along the transverse line of the support.

In order to avoid applying the beam to the "white" surfaces 40, provision is made for interrupting the beam 42 when it is deflected in the direction of the non-inked surfaces 40.

A component 44 for cutting off the beam 42, shown diagrammatically in FIG. 4, thus avoids concentrating the beam 42' on non-inked points. This cutoff component is advantageously coupled to the dot-by-dot printing computer system which triggers its obturation when the deflected beam 42' is directed towards the non-inked surfaces 40.

For very rapid cross-linking, the cutoff component 44 must have a very short reaction time. The component 44 is for example a "Q-switch" device as used in optronics. Other means of interrupting the beam 42 are within the capability of a person skilled in the art without departing from the scope of the present invention.

It should also be noted that the means of interrupting the beam can form an integral part of the laser 43. Thus the laser delivers, on demand, ultraviolet radiation pulses when the sweeping device 45, 46 is aimed at an inked dot 41' and does not deliver a pulse when the sweeping device 45, 46 is aimed at a non-inked point 40.

In the second variant, the sweeping device 45, 46 is programmed to deflect the beam 42' to an inked dot 41' and pass directly to another deflection angle, the beam 42" being directed to another inked dot 41". The sweeping command to the device 46 is then discontinued and the position of the mirror 45 passes without transition from one angular value to another discrete angular value.

Provision is made for correcting the spread of the beam when the beam 42'" falls on the support at a low angle, i.e. when the deflection of the beam is high. This correction is obtained by providing a so-called flat field correction lens which reduces the spread of the beam under such conditions and focuses it at a point.

A second embodiment of the method according to the invention provides for another method of applying the ultraviolet beam to the points on the support, instead of the sweeping step.

Figure 5:
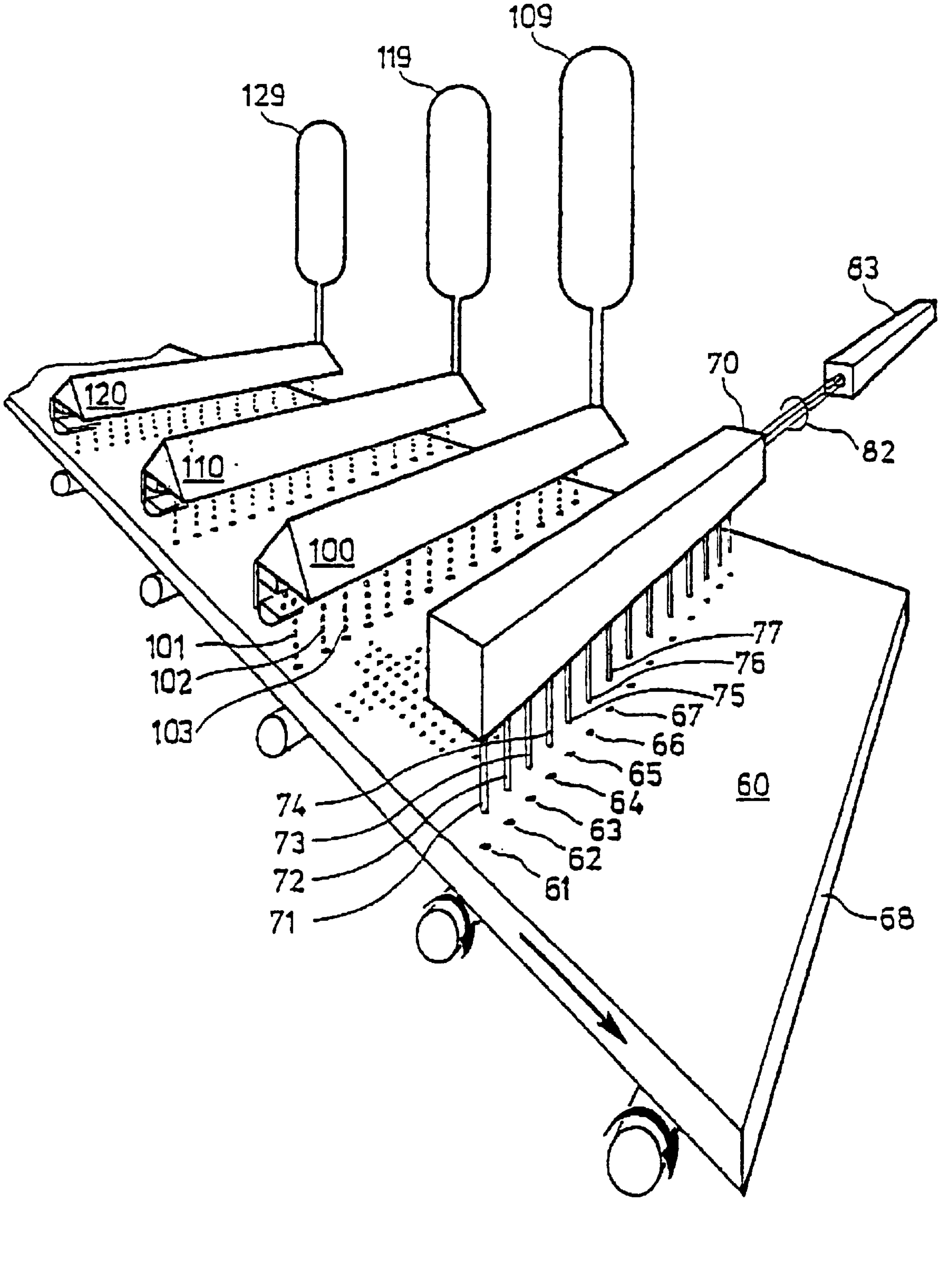
FIG. 5 depicts a second embodiment of the method of cross-linking photosensitive ink according to the invention.

The second embodiment has, as illustrated in FIG. 5, a linear array 70 of parallel optical fibres 71 to 77, whose output is disposed opposite the surface of the support to be cross-linked. In an equivalent manner, a two-dimensional array of optical fibres with parallel outputs can be provided. The beam 82 of the laser 83 is injected at the input of the optical fibres 71 to 77. The fibres 71 to 77 advantageously have their inputs connected together so that the laser radiation entering is distributed substantially equally between all the fibres.

Thus the initial laser beam 82 is divided into a multitude of parallel rays, each ray being directed and concentrated towards an inked dot on the support 68.

The optical fibres used are made of quartz or glass transmitting the ultraviolet radiation, an optical fibre made of ordinary glass not transmitting the wavelengths beyond violet.

The device 70 for distributing the beam 82 also has means of interrupting the ultraviolet beam, each optical fibre 71 being provided for example with a ray cutoff component in order to avoid exposing a non-inked point 60 on the support 68.

This second embodiment is particularly suitable to printing methods including a screening of points. By adapting the separation pitch of the outlets of fibres in the linear array 20 to the screening pitch of the printing, a series of laser beams is obtained concentrated on the precise coordinates of the points in the printing screen.

As illustrated in FIG. 5, the second embodiment applies advantageously to the inkjet printing methods which allow line by line printing, a line of dots being inked instantaneously.

A device using an in-line inkjet generally has a linear array 100 of ink drop generators. A series of ink drops 101, 102, 103 is emitted simultaneously in the direction of the points on the support which it is wished to ink.

Such devices are notably used in multicolour offset printing by disposing several generator arrays 100, 110, 120 fed by reservoirs 109, 119, 129 of inks of different colours. All shades of colours and tints are obtained by modulating the volume of the ink drops, and using inks corresponding to the primary colours and possibly to black. As detailed in FIG. 4, each coloured dot 51 is formed for example by three or four inked elementary dots 51*a*, 51*b*, 51*c* of primary colours or black.

The inked dots in different colours can be cross-linked according to the invention by applying a laser ray to each coloured dot.

The elementary dots, generally microscopic, are very close and may possibly overlap.

The effect of polychromy is obtained, during offset printing, by modulating the sizes of each microscopic elementary dot in order to reconstitute all possible colours. According to a variant, by modulating the overlap and size of each dot, a multicolour effect is thus obtained.

Advantageously, according to the invention provision is made for modulating the concentrated beam applied to such inked dots so that each dot receives sufficient energy for cross-linking the volume of ink in the dot. The laser beam interruption means are then replaced by means of modulating the intensity of the beam. Such a means consists for example of an optical modulator of the orientable diffraction plate type.

In general terms, the possibility of modulating the ultraviolet beam with respect to power makes it possible to adapt the cross-linking steps to the inks used and to the printing speed of the support.

The cross-linking method can be applied just once after all the colour inking steps as illustrated in FIG. 5. The beam distribution device 70 then has a tight network of optical fibres, the fibres being distributed spatially according to the maximum screen of inked points which can be formed on printing.

Alternatively, a cross-linking can be carried out according to the invention after each inking of a colour during a multicolour printing.

The printing installation can then include several cross-linking devices disposed at the output of each monochrome inking device.

The method according to the invention advantageously makes it possible to provide a total or partial gelling of the inks during cross-linking between each inking step, the partial gelling being obtained for example by modulating the power of the ultraviolet laser beam.

The essential advantage of the cross-linking method according to the invention is, as indicated previously, eliminating the drawback inherent in ultraviolet radiation, namely the discolouring or yellowing action on the polymers making up the support.

Provided initially for being applied to a support made of plastics material, the method according to the invention extends to the cross-linking of photosensitive ink on any type of printing support such as paper, cardboard or wood for advantageously replacing printing with ink based on water or solvents whilst preventing any browning of the support.

Finally, the rational use of the cross-linking light power according to the invention and the high light intensities which can be obtained with a laser has the advantage of increasing the speed of the cross-linking step compared with traditional insolation UV lamps.

Consecutively, the cross-linking method according to the invention advantageously helps to increase the throughput of the printing device into which it is integrated.

The method according to the invention thus makes it possible to obtain advantageously a cross-linking speed greater than the speeds of inking by inkjet, so that the printing rate is no longer limited by the cross-linking step.

Although the disclosure of the invention is based on ultraviolet radiation, the invention is not limited to a precise light spectrum, but can be applied with any type of light radiation adapted to polymerisation or drying of photosensitive inks.

In addition, the cross-linking method can be used with photosensitive paints, the same constituents and the same pigments being used in polymeric inking and polymeric painting.

Other advantages, applications and developments of the invention will be clear to a person skilled in the art without departing from the scope of the invention defined in the following claims.

What is claimed is:

1. A method of cross-linking photosensitive inks, comprising:

inking dots on a support; and applying an ultraviolet beam concentrated on the ink dots, to the exclusion of non-inked surfaces on the support.

2. A method according to claim 1, further comprising depositing dot by dot on a printing support drops of polymerisable ink, the ink being polymerisable by ultraviolet radiation.

3. A method according to claim 1, wherein the application of the ultraviolet beam is performed with an ultraviolet laser.

4. A method according to one of claim 1, wherein the application of the ultraviolet beam is effected by sweeping the support dot by dot.

5. A method according to one of claim 1, wherein the application of the ultraviolet beam is effected by means of at least one optical fiber.

6. A method according to one of claim 1, further comprising interrupting the ultraviolet beam when it is directed towards non-inked surfaces of the support.

7. A method according to one of claim 1, further comprising modulating with respect to power the light beam concentrated on the inked dots.

8. A method according to one of claim 1, wherein the support is made from plastics material.

9. A method according to one of claim 1, wherein it is part of a method of printing dot by dot by inkjet.

10. A multicolour printing method according to claim 1, wherein the method is applied to photosensitive inks of different colors.

11. A method according to claim 2, wherein the application of the ultraviolet beam is performed with an ultraviolet laser.

12. A method according to claim 2 wherein the application of the ultraviolet beam is effected by sweeping the support dot by dot.

13. A method according to claim 3 wherein the application of the ultraviolet beam is effected by sweeping the support dot by dot.

14. A method according to claim 2, wherein the application of the ultraviolet beam is effected by means of at least one optical fiber.

15. A method according to claim 3, wherein the application of the ultraviolet beam is effected by means of at least one optical fiber.

16. A method according to claim 4, wherein the application of the ultraviolet beam is effected by means of at least one optical fiber.

17. A method of cross-linking photosensitive inks, comprising:

inking dots on a support; and applying an ultraviolet beam concentrated on the ink dots.

18. A method according to claim 17, wherein the application of the ultraviolet beam is performed with an ultraviolet laser.

19. A method according to claim 17 wherein the application of the ultraviolet beam is effected by sweeping the support dot by dot.

20. A method according to claim 17, wherein the application of the ultraviolet beam is effected by means of at least one optical fiber.

21. A method of cross-linking photosensitive inks, comprising the steps of:

printing ink dots on a support; and selectively applying an ultraviolet beam to said support such that said beam irradiates the ink dots and is substantially inhibited from illuminating portions of the support which are devoid of ink.

22. The method of claim 21 wherein the ultraviolet beam is selectively applied by deflecting the beam from dot to dot across the support.

23. The method of claim 22 wherein said deflecting step comprises sweeping the beam across the support, and interrupting the beam while it is traversing an area of the support that is devoid of an ink dot.

24. The method of claim 21 wherein the ultraviolet beam is selectively applied by moving the support relative to the beam, and interrupting the beam while it is traversing an area of the support that is devoid of an ink dot.

25. The method of claim 24 further including the step of dividing the beam into an array of parallel rays, and selectively interrupting each of the rays as they traverse an area of the support that is devoid of an ink dot, respectively.

26. The method of claim 25 wherein said beam is divided by feeding it to a plurality of optical fibers arranged in an array.

27. The method of claim 21, further including the step of modulating the intensity of the beam in accordance with at least one characteristic of an ink dot to which the beam is applied.

28. The method of claim 27 wherein said characteristic includes the size of the ink dot.

29. A system for printing an image onto a support, comprising:

a printing device which deposits ink dots of at least one color on the support to form the image; and a curing device which selectively applies an ultraviolet beam to said support such that said beam irradiates the ink dots and is substantially inhibited from illuminating portions of the support which are devoid of ink.

30. The system of claim 29 wherein said curing device includes a movable mirror that deflects the beam from dot to dot across the support.

31. The system of claim 30 wherein said mirror sweeps the beam across the support, and further including an optical switching device that interrupts the beam while it is traversing an area of the support that is devoid of an ink dot.

32. The system of claim 29 wherein the ultraviolet beam is applied by moving the support relative to the beam, and said curing device includes an optical switching device that interrupts the beam while it is traversing an area of the support that is devoid of an ink dot.

33. The system of claim 32 wherein said curing device includes means for dividing the beam into an array of parallel rays, and means for selectively interrupting each of the rays as they traverse an area of the support that is devoid of an ink dot, respectively.

34. The system of claim 33 wherein said dividing means includes a plurality of optical fibers arranged in an array.

35. The system of claim 29, wherein said curing device includes a modulator that modulates the intensity of the beam in accordance with at least one characteristic of an ink dot to which the beam is applied.

36. The system of claim 35 wherein said characteristic includes the size of the ink dot.

37. A system for printing a color image onto a support, comprising:

a plurality of printing devices each of which deposits ink dots of a respective color on the support to form the image; and a least one curing device which selectively applies an ultraviolet beam to said support such that said beam irradiates the ink dots and is substantially inhibited from illuminating portions of the support which are devoid of ink.

38. The system of claim 37 wherein said plurality of printing devices are arranged serially along a path which said support travels during printing of the image, and said curing device is located downstream of all of said plurality of printing devices along said path to collectively cross-link the ink dots deposited by all of said printing devices.

39. The system of claim 37 including a plurality of said curing devices, wherein said plurality of printing devices are arranged serially along a path which said support travels during printing of the image, and an associated one of said curing devices is located immediately downstream of each printing device along said path to cross-link the ink dots deposited by the associated printing device.

* * * * *